(No Model.)
C. L. KLEITZ.
CABLE OR WIRE ROPE GUARD FOR STUMP PULLERS, &c.
No. 435,754.  Patented Sept. 2, 1890.
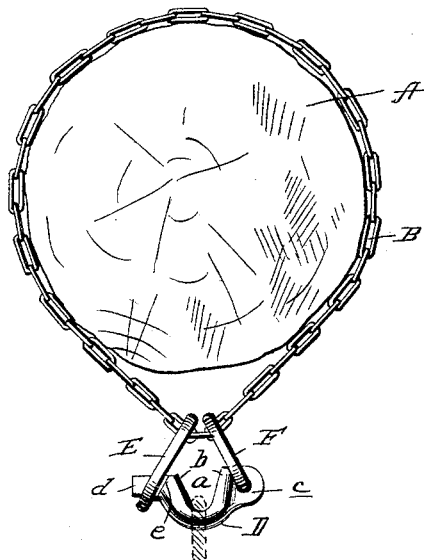
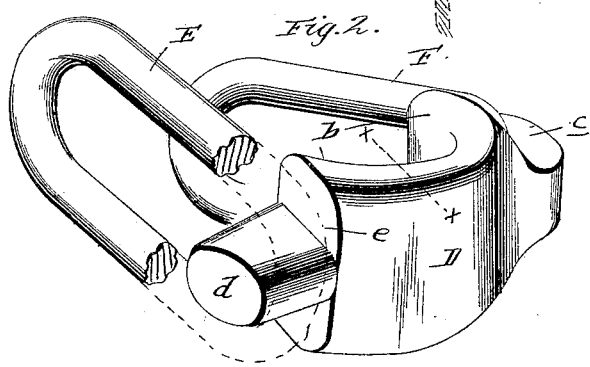
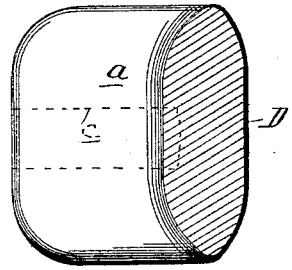
Witnesses:
Inventor
Carl L. Kleitz
By James J. Sheehy
Attorney

UNITED STATES PATENT OFFICE.

CARL L. KLEITZ, OF SIGOURNEY, IOWA.

CABLE OR WIRE ROPE GUARD FOR STUMP-PULLERS, &c.

SPECIFICATION forming part of Letters Patent No. 435,754, dated September 2, 1890.

Application filed June 5, 1890. Serial No. 354,329. (No model.)

*To all whom it may concern:*

Be it known that I, CARL L. KLEITZ, a citizen of the United States of America, residing at Sigourney, in the county of Keokuk and State of Iowa, having invented certain new and useful Improvements in Cable or Wire Rope Guards for Stump-Pullers, &c., of which the following is a specification, reference being had therein to the accompanying drawings.

This invention has relation to a cable-protector as used in apparatus for pulling or extracting stumps; and the novelty will be fully understood from the following description and claims, when taken in connection with the accompanying drawings, in which—

Figure 1 is a plan view of my improved device, showing the same in connection with a chain embracing a tree-stump and a portion of the cable in position. Fig. 2 is a perspective view of the protector, showing one of the links partly broken away; and Fig. 3 is a cross-sectional view taken in the plane indicated by the dotted lines $x\,x$ of Fig. 2.

In the accompanying drawings, A represents a tree-stump; B, a chain, which I employ to embrace the stump; and C indicates a portion of the drawing-cable, which is usually composed of rope or wire.

D indicates my improved device, which I shall denominate a "protector" for the cable. This protector is preferably cast and made very stout, so as to resist any strain brought upon it in operation. Said protector is of a form substantially as shown, being dished or recessed at $a$, so as to present flaring walls $b$, and is provided at one end with an integral eye $c$ and at its opposite end with a stud or lug $d$. This stud or lug $d$ extends from an oblique wall $e$, so that the link E may assume an oblique position, as better shown in Fig. 1 of the drawings, when attached to the stump-chain, and thereby avoid any tendency to leave its place while in operation.

F indicates a link, which is formed in the eye $c$, so that it may flex or hinge therein, and is also designed, together with the link E, to receive the stump-chain.

The cable C, which is preferably composed of rope or wire rope, passes through the recess $a$ of the protector, and by reason of its formation will always seat itself in the base of said recess. This base is beveled, as better shown in Fig. 3 of the drawings, so that the cable may pass freely over it and present but little wear.

In operation, after the stump-chain has been properly adjusted around the stump, one end is passed through the two links E and F, and after the outer end of the link E has been slipped over the stud or lug $d$ the parts will be in the position shown in Fig. 1 of the drawings. The cable C is then passed through the recessed portion of the device D, when the connection may be had between the stump-chain and consequently the stump and any ordinary or approved extracting machinery.

Having described my invention, what I claim is—

1. The protector-connection described, consisting of the casting D, having the eye $c$ on one end, the lug or stud $d$ on its opposite end, and the beveled wall recess $a$ intermediate of its ends, the link F in the eye $c$, and the link E, adapted to engage the stud or lug $d$, and both links adapted to receive a stump-chain, substantially as specified.

2. A protector-connection consisting of the casting having the beveled wall recess, an eye in one end and a stud on its opposite end, a link hinged in the eye, and a link adapted to engage the stud, substantially as specified.

In testimony whereof I affix my signature in presence of two witnesses.

CARL L. KLEITZ.

Witnesses:
A. G. SCHULTE,
WM. A. BELL.